Fig. 1

Oct. 8, 1940. W. C. GIBSON ET AL 2,216,972
COMBINATION FREIGHT TRUCK WITH CHANGEABLE CONTAINER
Filed Jan. 11, 1938 6 Sheets-Sheet 2

Fig. 2

INVENTORS.
WILLIAM C. GIBSON
LINDSAY R. HURST
BY
Eugene E. Stevens
ATTORNEY.

INVENTORS.
WILLIAM C. GIBSON
LINDSAY R. HURST
BY Eugene E. Stevens
ATTORNEY.

Oct. 8, 1940.      W. C. GIBSON ET AL      2,216,972
COMBINATION FREIGHT TRUCK WITH CHANGEABLE CONTAINER
Filed Jan. 11, 1938      6 Sheets-Sheet 5

INVENTORS.
WILLIAM C. GIBSON
LINDSAY R. HURST
BY Eugene E. Stevens
ATTORNEY.

Patented Oct. 8, 1940

2,216,972

UNITED STATES PATENT OFFICE 2,216,972

COMBINATION FREIGHT TRUCK WITH CHANGEABLE CONTAINER

William C. Gibson and Lindsay R. Hurst, Louisville, Ky.

Application January 11, 1938, Serial No. 184,474

6 Claims. (Cl. 214—65)

Our invention relates to power-driven freight-trucks with freight-containers. And the principal object of our invention has been the development of a combination freight-conveyance to facilitate the packing and movement of freight by saving time in the use of the power-truck and the service of the driver.

Other objects of our invention have been: first, to provide a power-winch and other means on said chassis and said freight-container for pulling said freight-container on or off said superstructure; second, to devise ways and means for the truck-driver, from his seat in the cab, not only to adjust the height of said superstructure, within certain limits, to the height of any loading platform for handling merchandise, but also, to roll said freight-container on or off the superstructure of the truck; third, to provide, in connection with the freight-container, the chassis and the superstructure, adequate means operative by the driver seated in his cab, for either shifting from road-gear into winch-gear and automatically unlocking said container to roll it off, or for shifting from winch-gear into road-gear and automatically locking said container securely in its normal riding position on said superstructure; fourth, novel means within reach of the seated driver for controlling the speed of the freight-container, as it is being rolled on or off said truck; and fifth, to provide effectual means for protecting said container and its load of freight from the weather, while locked in its normal riding place on said truck. And other objects of our invention will be explained in the process of this specification.

The foregoing objects have all been attained in our present invention; and our new and useful combination freight-truck with changeable container illustrated in the accompanying drawings which form a part of this specification, is a practical device embodying the aforesaid novel means and other new and useful details of construction, arrangement and combination of parts, all of which, together with their functions, will be described in detail with reference to said drawings and will be definitely pointed out in the claims that follow this description, so that any person skilled in the art may be able to construct and use this invention.

In said drawings.

This invention has been designed and developed in its various details for the desirable purpose of producing a convenient and efficient conveyance for handling and hauling merchandise at a minimum cost. And, with this purpose and the special objects aforesaid in view, we will describe our invention in detail, pointing out the new and useful features of construction, and the operations of the individual parts and the combination thereof as illustrated in the drawings hereinabove described, in which similar letters and characters refer to similar parts throughout the several views.

The power-winch

Figure 11:
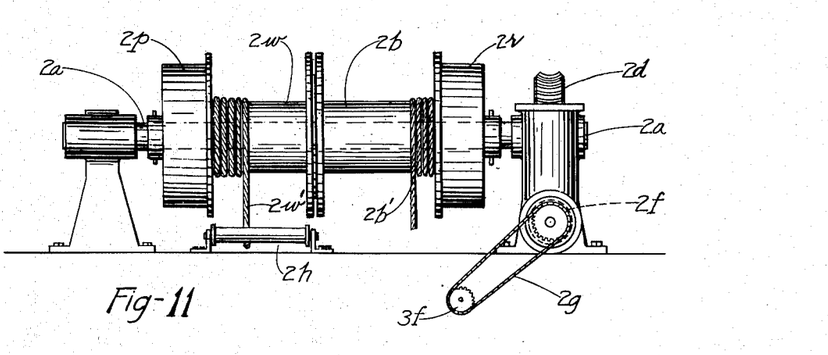
Fig. 11 is a back elevational view of the power-winch and its operative parts including the long idle roller installed under the pull-off reel.

In the invention and construction of our new combination freight-truck with interchangeable freight-container, we have redesigned and refitted a power-truck chassis with such equipment as we have found of practical service in the full development of our new invention. And, specifically, we would explain that just behind the cab I of the power-truck, on the chassis thereof, we have installed a new power-winch 2, comprising,—a supporting frame with shaft-bearings, mounted across the longitudinal truck-beams, a rotary shaft 2a in said bearings, a pull-on reel 2b with its cable 2b' and a pull-off reel 2w with its cable 2w' both idly mounted on said rotary shaft, with a thick bronze washer between them, a rotary clutch on either end of said winch-shaft, controlled from the cab I and adapted to operate said cable-reels, 2b and 2w. The winch-shaft 2a is driven by means of a worm-gear 2d mounted thereon and its worm 2f operated by means of a broad-chain belt 2g operating over a gear on the outer end of the worm 2f and over a companion gear on the outer end of rotary shaft 3a operative through the auxiliary transmission 3, generally known as the "split-propeller-power-take-off," shown in Fig. 1. And under the pull-off reel 2w, we have installed a long, idle roller 2h, shown in Fig. 11, adapted to carry the pull-off cable 2w' across its underside to give said cable a uniformly low extension from its reel 2w, in alinement with the cable-conduit 2m, through which said cable passes on its way to the sheave-wheel 2n horizontally installed near the rear of said superstructure. And on the rear ends of the cables, 2b and 2w, there are securely fastened strong draft-hooks designed to be hooked into the two holes 1a', 1a' in the front portion of the broad drawbar 1a securely installed in the front end of the freight container 1, shown in Figs. 7 and 8.

The refitted chassis

Figure 7:
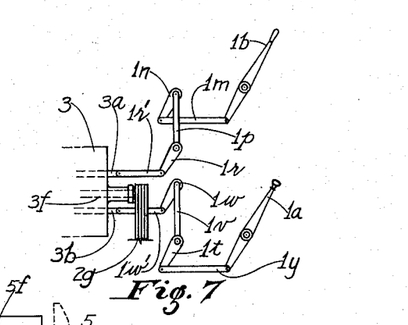
Fig. 7 is a perspective view in elevation of the lever for shifting from road-gear to winch-gear and the lever starting the rotation of the winch-shaft, and their contiguous hinged links leading to their respective arms operating the required gear-shifts in the auxiliary transmission-gear casing, shown in Fig. 1.

Just back of the power-winch 2, we have installed an auxiliary transmission gearing 3, or a "split-propeller-power-take-off," adapted to give us, through the reciprocating rod 3b, installed therein a change of speed, or, if desirable, a change of direction in the rotation of the rotary shaft 3f which drives the winch-worm 2f through the broad chain-belt 2g operating the worm-gear 2d fixed on the winch-shaft 2a. The reciprocating rod 3b is operative from the cab I by means of lever 1a through its contiguous links 1y, 1t, 1v and 1w, as shown in Fig. 7. And in the movement of the speed and reverse lever 1a, in the cab, the driver can conveniently free either one or both of the cables 2b', or 2w', from slack-loops that may occasionally occur in them from a too free forward movement of the freight-container 1, as it is being pulled into its riding place on said superstructure.

Figure 1:
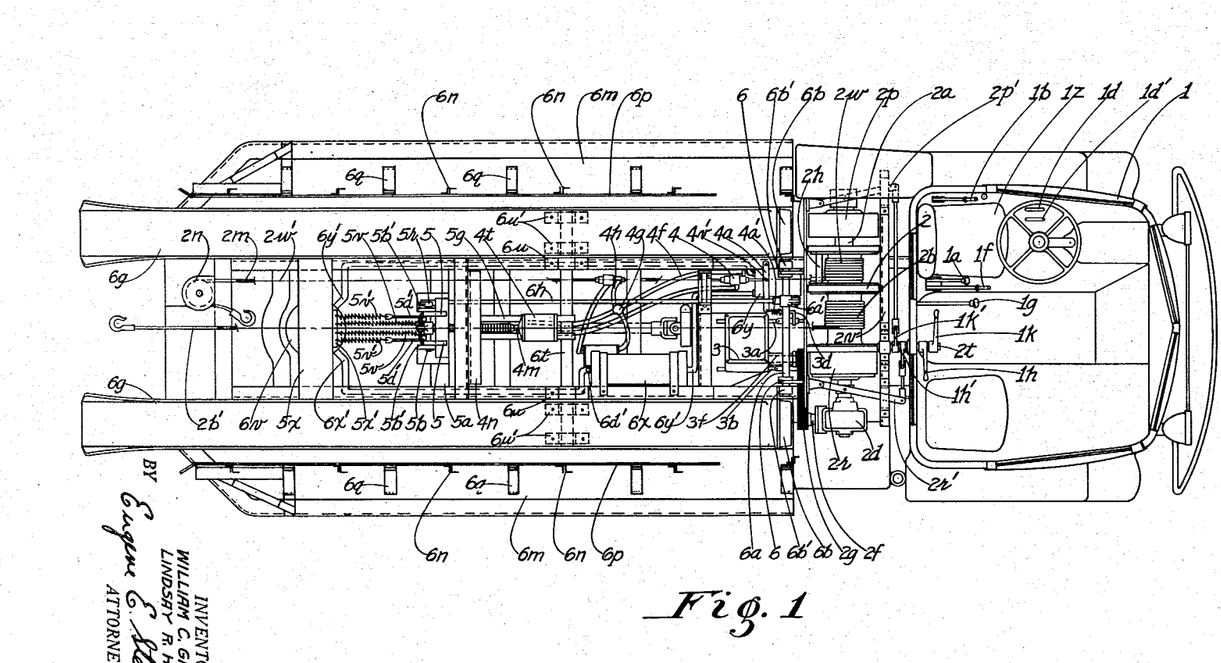
Fig. 1 is a plan view of the assembly of the interior of the cab, the cable-winch, the chassis, the superstructure and other essential service parts of our combination freight-truck, with the canopy-frame and the container removed.

In the cab 1, at the left side of the driver's seat, we have installed a lever 1b adapted for shifting the transmission gearing from road-gear to winch-gear through the contiguous links 1m, 1n, 1p, and 1r attached, by means of the clevis-link 1r, to the reciprocating arm 3a shown in Figs. 1 and 7. Now, when we push backward lever 1b, we are pulling forward the reciprocating arm 3a, which we have set operatively through the near-side of the enclosed group of transmission gearing 3 to throw the truck out of road-gear into winch-gear. But, as we pull forward the reciprocating arm 3a, we should notice that another part of our chassis-mechanism moves automatically; for on the shank of the reciprocating arm 3a we have fastened an angle-bracket 3d, to the outer end of which is attached a helical extension spring 4a' engaging the inner free end of the horizontally swinging arm 4a, the outer end of which is fixed to the chassis in a pintle-hinge 4b. And, a short distance back of said horizontal swinging arm 4a on the chassis-frame we have installed an oblong air-valve 4 with its operative stem attached in a pintle-hinge 4v' to said swinging arm 4a at right-angles thereto and adapted to pull open said air-valve as the free end of said swinging arm 4a swings forward. And on the inner side-vent of the valve 4, we have attached the air-hose 4d which extends backward over a cross-beam of the chassis-frame to an opening in the front end of the air-power cylinder 4t installed on the carrier-rack hinged over the rocker-shaft 6t near the central part of the superstructure, a short, operative distance in front of a locking-mechanism which we have securely mounted on the cross-plate 5a of the superstructure. And which we will later describe in detail. But on the outer side of said air-valve 4 we have used another valve-vent to which we have attached another air-hose 4f which extends back through a T-connection 4g in the air-brake line 4h and back farther to another opening in the rear end of said cylinder 4t, to which said hose is operatively attached.

The locking mechanism above mentioned consists of two heavy locking-hooks, 5, 5, set a short distance apart, parallel to each other and pointing towards the front of the chassis. These locking-hooks, 5, 5, are strongly keyed in place on the round rocking-shaft 5b whose ends are journaled in the upright flanges of two opposite, broad angle-plates, 5b', 5b', whose horizontal flanges, set between said upright flanges, are securely mounted, as we have said above, on the crossplate 5a of the superstructure, shown in Figs. 1, 5 and 6.

Figures 5, 6:
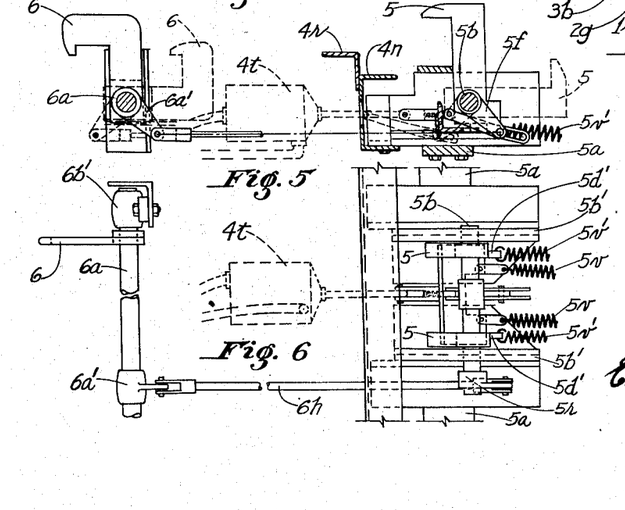
Fig. 5 is a detail view of the front and the rear locking-hooks and their coacting operative mechanism, partly in section and partly in elevation. The dotted lines show the outlines and the relative position of the air-power cylinder and its supply and exhaust hose and piston-stem, also the location of said locking-hooks in their idle position.
Fig. 6 is a detail plan view of the front and the rear locking-hooks and their coacting operative mechanism. The dotted lines show the shape and the relative position of the air-power cylinder and its supply and exhaust hose and its piston-stem.

These two locking-hooks, 5, 5, are provided with strong front projections near the tops thereof, designed, when said container is set in its normal riding position on the superstructure of the truck, to hook over the safety-bar 7d strongly installed across the central part of the container 7 under the flooring thereof, between the central wheels, 7a, 7a. And said locking-hooks are, further, provided with strong extension-heels, 5d, 5d, at their lower back edges, designed to take part in locking said hooks securely in their upright position when hooked over the safety-bar 7d of the container 7 to prevent it from rolling back out of its normal riding position on the truck in transit.

Of course, when the pull-on reel 2b is locked with the clutch set in, and the pull-on cable 2b' is hooked into the draw-bar 7g of said container, the cable 2b' will hold the container in its normal riding place on the truck; but, as a provision against broken cables and, for additional safety in driving over rough and hilly roads, we have devised and installed these rear locking-hooks 5, 5, and their contiguous operative mechanism, mounted on the cross-plate 5a of the truck; and we have also, provided two front locking-hooks, 6, 6, strongly mounted and keyed on the round, rocking shaft 6a, near either end thereof; said shaft being journaled in the pillow-blocks, 6b', 6b' mounted on the inner sides of the container-bumpers, 6b, 6b, at the front of the superstructure. These front locking-hooks, 6, 6, are adapted, when raised to their service-position, to engage the horizontal flange 7f of the front, bottom channel of the frame of the container 7, when said container is set in its normal riding position on said superstructure. And, as it is imperative, in operation, that these two sets of locking-hooks, in front and rear, move simultaneously up into their locking positions, or down into their idle positions, we have provided a crank 5t keyed on the shaft 5b near the end thereof, as shown in Fig. 6; and on the shaft 6d, which rocks the front hooks, 6, 6, we have securely fixed another crank 6f in operative alinement with the crank 5t; and between these cranks we have installed a straight, rigid rod 6h reaching from one to the other of said cranks, to which the rod 6h is operatively connected at its ends by means of clevis-joints, in such a way that, when one of said shafts is rocked, the other shaft, also rocks in the same direction.

We have, therefore, devised the following means for rocking the shaft 5b to raise the locking-hooks, 5, 5, to their upright service-position, and means, also, for securely locking them in said position, so that, when hooked over the safety-bar 7d of the container 7 in its normal riding position on the superstructure, these locking-hooks, 5, 5, would help prevent the container from rolling back out of its said position, on the channel rails. And, now that we have connected up this shaft 5b with the shaft 6a by means of the rod 6h and its clevis-joints with said cranks in such a way that when shaft 5b is rocked to raise the locking-hooks, 5, 5, to their service-position, the connected shaft 6a is automatically rocked, also, in the same direction and raises its locking-hooks, 6, 6, upright into their service-position, in which, when hooked over the horizontal flange 7f of the front, bottom channel of the frame of the container 7, they help hold said container from rolling back out of its normal riding position on the superstructure of the truck.

Now, for rocking the shaft, 5h, to raise or lower its locking-hooks, 5, 5, and consequently, also, the front locking-hooks, 6, 6, we have installed an air-power cylinder 4t in a horizontal position on a carrier-rack 5g securely fastened in the superstructure and also, supported on the rocker-beam 6t, near the central part of the truck, at a short, operative distance in front of tht locking-hooks, 5, 5, and their suporting angle-plates, 5b', 5b'. This air-power cylinder 4t is provided with a piston and its connected operating stem 4m, which extending back toward the middle of the rocking-shaft 5b, is adapted to make operative connection with parts of the coacting mechanism involved in the essential control of the locking-hooks, 5,5, and 6, 6. Said coacting mechanism consists of some other parts in addition to those previously mentioned. For example: we felt the urgent need for a very strong and reliable locking device for these locking-hooks, 5, 5, while set in their service position. Accordingly, we made said hooks with integral extension-heels, 5d, 5d, and across their front, on the base-flange of the angles, 5b', 5b', we placed the angle-piece 5h adapted to slide back and forth on said base-flanges. And, on the horizontal flange of the angle 5h, we welded heavy steel plates, 5m, 5m, extending back in line with the ends of said flange and adapted to reach back under said hook-heels to prevent them from moving downward, when the angle-piece 5h has been moved back to its limited extent, as shown in Figs. 1, 5 and 6.

Now for raising and lowering these rear locking-hooks, 5, 5, and consequently, the front locking-hooks, 6, 6, whose rocking shafts are operatively connected; and, also, for moving this angle-piece 5h back and forth, so that the steel lock-plates, 5m, 5m, that lock the hooks, 5, 5, against swinging down, may be pushed under the extension heels of said hooks to lock them, or withdrawn therefrom to release them, at the option of the truck-driver, we have provided the following very efficient means.

Figure 3:
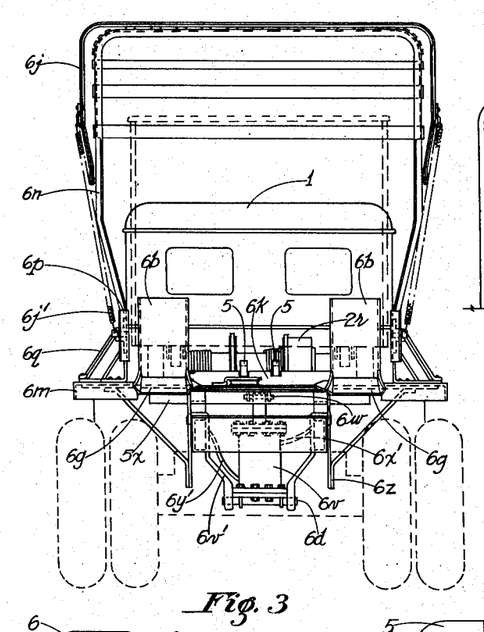
Fig. 3 is a rear elevational view of our combination freight-truck with the changeable container in its normal riding place on the superstructure of the truck, shown in its lowest position with the rear extension canopy-frame set in its service position.

On the rocking-shaft 5h, midway between the locking-hooks, 5, 5, we have mounted and keyed the strong crank 5f, adapted, when moved, to rock said shaft. And for operating this crank, and connecting it up to the air-power cylinder 4t, we have devised a slotted clevis-attachment 5w adapted to engage the outer end of said crank on either side thereof in a cross-pin connection and to extend forward under the rocking-shaft 5b to a clevis-connection with the threaded eye-bolt 5n, which passes through a hole in the vertical flange of the angle-piece 5h; said eye-bolt being rigidly held in its place by being screwed into the square solid end of the clevis 5p abutting the opposite side of said vertical flange. And the front end of said clevis is attached in a pintle-hinge to the eye-loop in the end of the stem 4m of the air-power cylinder 4t, as shown in Figs. 5 and 6. The stem 4m operates through an opening in the web of the channel 4n, a chassis-brace, to which is attached an extension angle-brace 4r adapted to help support a heavy sheet iron cover 6k, as shown in Fig. 3, for shielding the operative mechanism of said locking-hooks.

If, therefore, we bear in mind the fact that the air-power cylinder 4t is operatively connected into the air-brake line 4h at the T-connection 4g, through the air-hose 4f, by the way of the air-valve 4 and the companion-hose 4d, we can readily understand that the powerful reciprocating action of the piston in the air-power cylinder 4t, acting through the piston-stem 4m, will exert a strong pull or push upon the slotted clevis-connection part 5w and the end of the crank 5f, pulling said crank forward or pushing it back, according to the direction of movement of said piston.

Therefore, if we start to operate the locking-hooks, while they are up in their service position, as shown in Figs. 1, 5 and 6, locked by means of the lock-plates, 5m, 5m, we can unlock the hooks and lower them down to their idle position by moving the piston of the air-power cylinder forward, away from the hooks, 5, 5. This movement exerts a pull on the slotted clevis-attachment 5w and on the angle-piece 5h, to which the lock-plates, 5m, 5m, are attached. But the crank 5f and the hooks do not yet move, for, as in Fig. 5, we can see that the cross-pin connecting the slotted clevis-attachment 5w with the crank 5f, is now in the front ends of the slots in the clevis; and, as the clevis-attachment 5w moves forward, pulled by the piston and connections, the cross-pin and the crank 5f and the hooks, all remain stationary, until the rear ends of the slots come to engage the cross-pin. But, by this time, the angle-piece 5h forced by the eye-bolt 5n screwed tightly against the inner side of the vertical flange of the angle-piece 5h, has already moved forward away from the locks, 5, 5, far enough to have drawn the lock-plates, 5m, 5m, clear from under the extension heels of the hooks, 5, 5, so that said hooks are free to turn down; and the crank 5f of the rocking-shaft 5b starts rocking said shaft and its attached hooks, 5, 5, down to their idle position.

We can now understand the utility of this long slot in either side of this slotted clevis-attachment 5w on the crank 5f. For the slots therein allow sufficient movement of the angle-piece 5h for the withdrawal of the lock-plates, 5m, 5m, from under the extension heels, 5b, 5b, of the hooks, 5, 5, before the rocking-force is applied to the crank 5f to rock the hooks down to their idle position. And the crank 5t on the end of the rocking-shaft 5b, has also rocked down far enough to force the straight, stiff rod 6h, operatively connected to the crank 6f keyed on the rocking-shaft 6d, to rock said shaft down and thus swing the front locking-hooks 6, 6, also, down to their idle position at the same time, as shown in the dotted lines of Fig. 5.

In the operation of these coacting parts involved in the raising and the lowering of these locking-hooks, there is more or less lost-motion, which we have successfully counteracted by means of two sets of helical extension springs installed as follows: Both sets of springs have a common anchorage in an attachment-plate 5x' fastened to the cross-beam 5x of the super-structure, a short distance in the rear of the locking-hooks, 5, 5. And the inside set is composed of two springs, 5v, 5v, each one being hooked into the rear end of one of the lock-plates, 5m, 5m, which are adapted to slide under the heels of the locking-hooks, 5, 5. These inside springs are designed to keep said plates and their connections under desirable rearward tension in operation. And the outside springs are divided into two groups, 5v', 5v', of equal tension, each group of which is attached to one of the arms, 5d', 5d' fastened in a pintle-hinge to the heels, 5d, 5d, of the locking hooks 5, 5, as shown in Figs. 1 and 6. These outside springs, 5v', 5v', operative on the heels of said locking-hooks, being strong enough to counteract the tension of the antagonistic inside springs acting on the lock-plates, 5m, 5m, are designed to take up all lost-motion in the shifting of said contiguous operative parts, keeping said locking-hooks under constant tension with an upward inclination toward their service-position.

Now, to enable the driver to operate these front and rear locking-hooks from his place in the cab of the truck, we have provided in the cab 1, at the left of the driver's seat, as we have briefly explained before, a lever 1b, shown in Fig. 7, with its connecting links, 1m, 1n, 1p and 1r installed under the cab 1 and the winch 2, and adapted to operate the reciprocating arm 3a functioning in the set of auxiliary transmission-gearing 3 designed to shift the truck-gears from road-gearing to winch-gearing and back again to road-gearing. And in this gear-shifting mechanism, as the truck-driver forces the lever 1b backward, the reciprocating arm 3a, in the inner side of said transmission-gearing, is drawn forward, carrying with it the angle-bracket 3d, which has an extension spring 4a' connected with the inner end of the swinging arm 4a rocking on the pintle-hinge 4b on the chassis beam.

Figure 4:
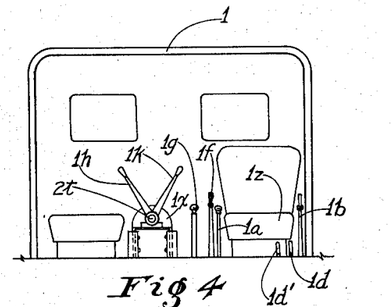
Fig. 4 is an elevational view of the inner parts of the cab, looking toward the back thereof.

Now, just back of this swinging arm 4a, as we have previously explained, we have installed in the chassis frame an oblong, cylindrical air-valve 4, having a front and a rear chamber therein and an axial reciprocating valve-rod carrying a double valve-cushion rigidly fastened thereon and adapted to operate between said chambers for closing either chamber alternately. Said valve-rod is normally spring-pressed toward the rear end of the valve 4, thereby normally separating said front chamber from said rear chamber, which is always open to atmospheric pressure.

But the front chamber of said air-valve, has two vents: one a permanent inner-side vent leading through the air-hose 4d back into the front chamber of the air-cylinder 4t; and the other, a shifting vent, leading through the air-hose 4f, the T-connection 4g in the vacuum brake-line and on into the rear chamber of the air-cylinder 4t, shown in Fig. 1. Therefore, while the truck-motor is running, all these said parts contain a practical vacuum, the same as that in the vacuum brake-line, coming from the intake manifold of the truck-motor. But the shifting vent in the outer side of the valve 4 is open into the front chamber of said valve, when the valve-cushion of the rear chamber is closed; but said vent is open to the rear chamber of said valve when the valve cushion of the front chamber is closed.

Now, the valve-rod in the air-valve 4 is drawn forward by means of its stem 4v attached in a pintle-hinge 4v' to the swinging arm 4a. And when the reciprocating arm 3a is drawn forward to shift the truck from road-gear to winch-gear, the arm 4a swings forward taking along with it the rod-stem 4v and its connected valve-rod and valve-cushion, far enough to completely close the front chamber of said air-valve, holding the vacuum therein and in the air-hose 4d and in the front chamber of the air-cylinder 4t. But this movement of the valve-rod, also opens the shifting vent in the outer side of said valve into the rear valve chamber, which always contains normal atmospheric pressure. Consequently, the vacuum disappears from the air-base 4f, the brake-line and the rear chamber of the air-cylinder 4t; and, therefore, the piston of said air-cylinder moves forward with great force, taking along with it the piston-stem 4m, together with all its connected parts that coact with it in the operation of both sets of said locking-hooks, thus throwing down both sets thereof to their idle positions, as above described. So that the freight-container 7, in its normal riding place on the rails, 6g, 6g, of the superstructure, may now be pulled off onto a loading platform of the normal height of said rails, by means of the pull-off reel 2w; and a second container may then be pulled on in place of the first container, by means of the pull-on reel 2b, as we will shortly explain. And when said second container has been pulled on over the rails, 6g, 6g and is resting against the container bumpers, 6b, 6b, the truck-driver should, then, raise the front and the rear locking-hooks to help hold said container from rolling back out of its normal riding place on the rails, 6g, 6g of the superstructure. And that the driver may be able to pull off the first container and to pull on the second container while seated in his place in the cab, we have installed in the cab 1 at the right side of the driver's seat, the gear-shift lever 1a, effective through its contiguous and coacting links, 1y, 1t, 1v and 1w, shown in Fig. 7, installed under the cab 1 and the winch 2, and connected in the clevis-link 1w with the reciprocating rod 3b operative in the set of auxiliary transmission gears 3. And the driver may now grasp this lever 1a and push it back to its lowest notch. This movement of lever 1a and its said connections, forces the reciprocating rod 3b forward, connecting up the operative gear on the rotary shaft 3f, which we have installed in this auxiliary transmission gearing 3, to drive the winch-reels 2b and 2w. This rotary shaft 3f is adapted to operate the chain-belt 2g driving the worm 2f, normally in mesh with the worm-gear 2d keyed on the winch-shaft 2a. And the winch-shaft 2a thus begins turning; but the reels 2b and 2w, being idle on said shaft, do not yet turn.

Now, for controlling the movements of the winch-reels 2b and 2w, we have installed a separate clutch at either end of the winch-frame, adapted to lock either reel to the rotary winch-shaft 2a. And the clutch 2p for the pull-off reel 2w is operated by means of the arm 2p' and its horizontal link connected to a crank keyed on the rocking shaft 2t having its rear-end bearing in the pillow-block 2t' mounted on a supporting angle-piece 2v of the winch-frame; while the front-end of said rocking-shaft extends a predetermined distance through a bearing 1x installed in the back of the cab 1, shown in Figs. 1 and 4. And upon the front end of said rocking-shaft extending through said bearing installed in the back of the cab 1, we have keyed the control-lever 1k designed for controlling the movements of the pull-off reel 2w from the inside of said cab. But the clutch 2r for the pull-on reel 2b is operated by means of the arm 2r and its horizontal link connected to a crank 1h' rigidly fastened on a sleeve of predetermined length, mounted on that part of said rocking-shaft that passes through the bearing 1x installed in back of said cab. Said sleeve is adapted to rock independently of the rocking-shaft 2t. And upon that part of said sleeve that extends into the cab through said bearing, we have rigidly fastened the control-lever 1h designed for controlling the movements of the pull-on reel 2b, from the driver's seat in the cab, Figs. 1 and 4.

Accordingly, now that the driver has lowered the locking-hooks from their service position hooked on the underside of the container, down to their idle position, the container can now be rolled off onto a loading platform. To do this, the driver grasps the lever 1k, controlling the movements of the pull-off reel 2w; and pushes it over towards the lever 1h. This movement rocks the shaft 2t, swinging its crank 1k' inwardly and drawing along with it the horizontal link and its connected swinging arm 2p', which is adapted to force the rotary clutch 2p over into operative contact with the pull-off reel 2w; and said reel begins to wind up its cable 2w' which extends downward under the guiding idle roller 2h, beneath said reel and then rearward through the cable-conduit 2m and round the sheave-wheel 2n installed on the flooring-frame of the superstructure, shown in Fig. 1, and forward again to the draw-bar 7g at the front of the container 7, into which it is hooked. And if the container, in being pulled off, rolls too freely the driver grasps the control-lever 1h of the pull-on clutch; and sets the clutch 2r against the pull-on reel just hard enough to ease the container off the superstructure under his control.

Now, when the first changeable container, rolling off the truck to the loading platform, is completely clear of the broad rails, 6g, 6g, of the superstructure, on which it has been riding, and is unhooked from the reel-cables, the container, regardless of its weight, moveable on its center-wheels, 7a, 7a, and its front casters, 7b, 7b or its rear casters, 7h, 7h, may readily be rolled round by hand, out of the way; and a second changeable container may, in turn, be rolled around to face the broad container-rails, 6g, 6g, in position to be connected up to the cable-hooks and pulled onto the truck for transportation to another place. And to accomplish this, the driver, sitting in his seat 1z in the cab, pulls the control-lever 1k back to its original position to release the pull-off reel 2w, so that it may be idle again, to allow its cable 2w' to unwind, as it is hooked to the draw-bar 7g at the front of said second container about to be pulled onto the truck. And the driver then grasps the pull-on control-lever 1h mounted on the sleeve 2t' rocking over the shaft 2t, and pulls the lever towards him. This movement rocks the sleeve 2t' which swings its crank 1h' inwardly, drawing along with it its horizontal link and its connected swinging arm 2r', which, when thus applied, is adapted to force the rotary clutch 2r over into operative contact with the pull-on reel 2b; and said reel begins winding up its cable 2b', which extends directly back over the superstructure floor, Fig. 1, to the draw-bar 7g of the container 7 to be pulled onto the truck. But, if the container, in being pulled on, rolls too freely, the driver grasps the control-lever 1k of the pull-off clutch 2p and sets the clutch just hard enough to ease said container onto the truck under his control, until the container comes to rest against the container-bumpers, 6b, 6b, at the front end of the container rails, 6g, 6g, of the superstructure. Then the truck-driver releases the clutch of the pull-off reel, but leaves the clutch of the pull-on reel still locked on the pull-on reel. But, to stop the cable-winding of the pull-on reel, the driver returns the gear-shift lever 1a to its original position in its neutral notch. And the movement of this lever 1a, effective through its contiguous and coacting links, 1y, 1t, 1v, and 1w, shown in Fig. 7, as we have previously explained, pushes back the reciprocating rod 3b to its neutral position in the auxiliary transmission gearing 3 and thus throws the rotary shaft 3f out of operative gear; so that the rotary winch-shaft 2a with its cable-winding stops.

The driver next must raise both sets of locking-hooks up to their service position, hooked on said under parts of the container. To accomplish this, he must reverse the operation of the principal parts of the mechanism involved in laying the hooks down to their idle position. In other words, the driver must pull forward again the gear-shifting lever 1b, at the left of his seat. The forward movement of this lever 1b, working through its contiguous and cooperative links, 1m, 1n, 1p and 1r, shown in Fig. 7, pushes back the reciprocating arm 3a in the auxiliary transmission gearing 3, thus throwing the truck out of winch-gear back into road-gear.

But the reciprocating arm 3a in its rearward movement, carried back with it the angle-bracket 3d attached thereto; and, consequently, the tension on the extension spring 4a' attached to the swinging arm 4a, is practically relieved; and under the rearward force of the compression-spring in the air-valve 4, acting on the valve-rod and its operative stem 4v attached to the swinging arm 4a, arm 4a is now returned back to its normal position, as shown in Fig. 1. In the same movement, the valve-rod with its double valve-cushion has shut off the air from the air-hose 4f and the rear chamber of the power-cylinder 4t; and immediately a vacuum from the brake-line forms in the air-hose 4f and in the rear chamber of the power-cylinder 4t; and the piston thereof is quickly forced back to its original position in the rear of said power-cylinder, pushing its stem 4m rearward with ample force to throw both sets of locking-hooks up to their service positions and to hook them to their respective engagement parts under the loaded container and to push the lock-plates, 5m, 5m under the heels of the locking-hooks, 5, 5, to brace them securely for holding the container from rolling back out of its normal riding place on its rails, 6g, 6g. And the combination freight-truck with its changeable freight-container is ready for the driver to start it in its way for another trip.

The superstructure

The superstructure which we have devised for use in the development of our combination freight-truck with changeable container, is composed of a strong, oblong rectangular base and canopy-frame installed thereon comprising a plurality of novel and useful parts: among which are two parallel container-rails, 6g, 6g, running the length of the superstructure and extending a little way back thereof; and the rear ends of said rails we have curved slightly downward to afford a gentle incline for the wheels of said container, rolling on or off said rails. But to arrest the forward movement of the container 7 at a definite place, as it is being pulled on over said rails, we have, in fabrication, turned up at right-angles thereto a portion of the front ends of both of said rails far enough to form integral bumpers, 6b, 6b, against which the container 7 is positively stopped when being pulled onto said truck, shown in Figs. 1 and 2. And to prevent the wheels of said container from rolling or slipping off the edges of said rails, we have selected broad channels for these rails, provided with guard-flanges of predetermined height, along the edges thereof on either side.

Another novel feature of said base-construction are the broad and strong walkways, 6m, 6m, on either side extending along said rails near the outer sides thereof. These walkways we have designed and installed therein, not only for use as walkways for the driver or an assistant; but also, for a firm foundation for anchoring and bracing an ample frame for a canopy to shelter the container 7 and its load of freight, from the weather.

Accordingly, upon each of these broad walkways, 6m, 6m, we have installed a line of angle-posts, 6n, 6n, to which on the inner side of both said lines, near the lower ends of said posts, we have riveted long, broad guard-plates 6p, 6p, along the smooth insides of which the freight-container 7 may easily slide, if it should touch on either side of said frame while being pulled onto or off from said truck. And above said guide-plates on either side of said canopy-frame, we have bowed the canopy-posts, 6n, 6n, outward for clearance. But, as a strong and rigid anchorage for said canopy-posts and their guard-plates, 6p, 6p, we have securely bolted to each of said walkways, along the outsides of said guard-plates a row of broad angle-braces, 6q, 6q, the vertical flanges of which we have riveted to the outside of said guard-plates.

In these two parallel lines of canopy-posts, 6n, 6n, along the opposite walkways of the superstructure, we have joined the upper ends of each pair of opposite posts, 6n, 6n, in the series front to rear, with a bow of angle-iron designed to support a weather covering of canvas or other suitable material; and the lap-portion of the joints thus formed we have securely riveted together. And to hold the respective pairs of said opposite posts and bows in their relative positions, and to enchance the rigidity and the strength of the canopy-frame as a structure, we have securely riveted to the outside of each pair of said opposite posts and their connecting bows a plurality of parallel, flat iron strips extending the entire length of said canopy-frame. And, as an additional protection from the weather, for the rear of the freight-container 7, while on the truck, we have provided an extension bow 6j mounted upon pintle-hinges on the rear pair of said posts and adapted to be swung up over the top of said canopy-frame in fair weather and to be swung back over the rear end of said freight-container in stormy weather. Said bow is designed to carry a weather-cover and to be held in place in either of its said positions by means of a strong extension spring 6j', shown in Figs. 2 and 3. And between said canopy-posts for the sake of greater rigidity therein, we have, also, bolted other short braces, as shown in Fig. 2.

Now, as loading-platforms in different places have different heights above the level of the streets, we have made provisions in the equipment and the mounting of our superstructure on said truck to enable the driver of the truck, while seated in the cab thereof to adjust the hight of the rear end of said superstructure to the hight of any loading platform within predetermined limits; so that the rear ends of the container-rails, 6g, 6g, may rest upon the platform for rolling said container on or off said truck.

Figure 2:
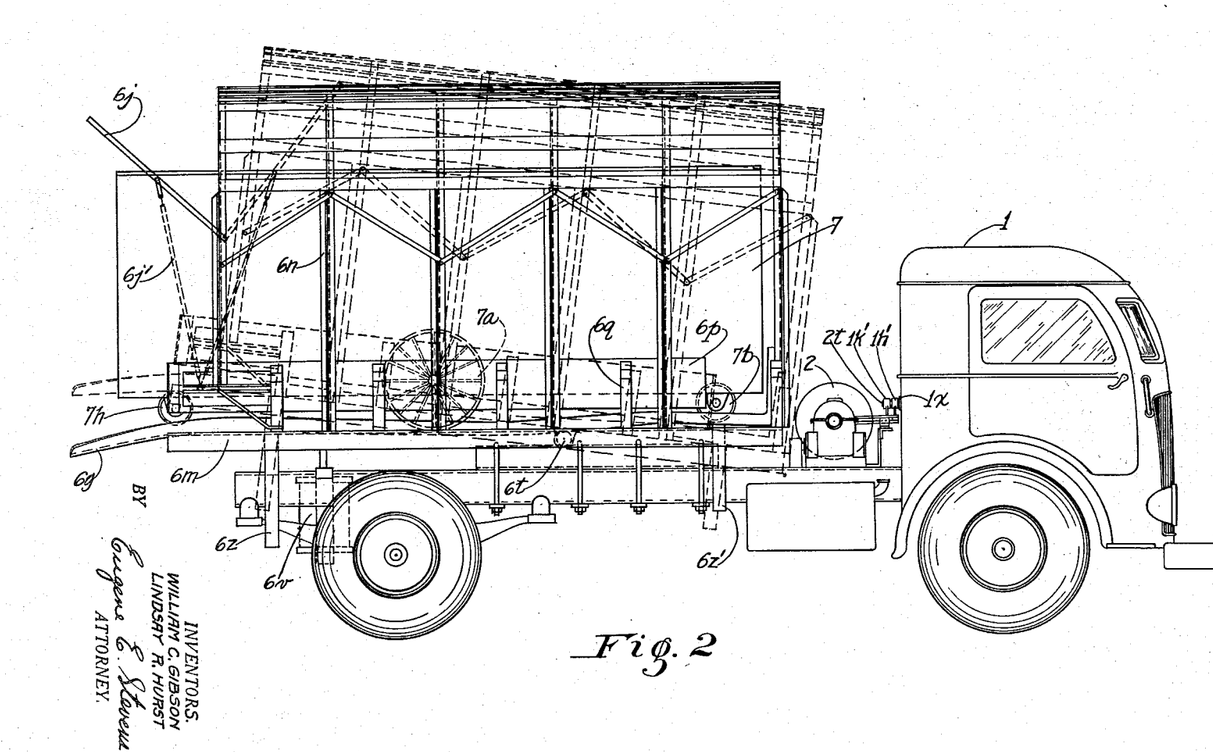
Fig. 2 is a side elevational view of our combination freight-truck with its changeable container loaded on the superstructure of the chassis, in its normal riding position; the dotted lines showing the relative position of the parts when the superstructure is raised to its highest elevation.

Accordingly, with this condition in view, a short distance back of the power-winch 2, by means of strong U-bolts with their yokes, we have securely mounted heavy channels, 6r, 6r, upon the truck-beams on both sides of said truck, as in Fig. 2. And on the upper flanges of said channels we have installed a heavy piece of rocker-shafting 6t reaching across the truck from one of said channels to the other, and extending beyond as far as the outer edges of the container-rails, 6g, 6g; said shafting being held in its service-position by means of the strong strap-clips, 6u, 6u, securely riveted to the upper flanges of said channels, shown in Fig. 1. And upon said rocker-shafting we have mounted said superstructure in such a way that the front and the rear ends thereof may be rocked up and down, as shown in Fig. 2, while said superstructure is securely held in its service-position on said rocker-shafting by means of the strong, double strap-clips, 6u', 6u', which we have securely riveted to each of said container-rails, on the underside thereof, shown in Fig. 1.

Now, to provide for the truck-driver, ample means for rocking the rear part of said superstructure up or down at his will, while seated in his cab, we have installed in the rear of the chassis on a rocking shaft 6d anchored in the lower end of a strong, pendent bracket 6v' hung and fastened over the beams of said power truck on either side thereof, an oil-power cylinder 6v provided with a piston having a large, strong stem whose upper end is provided with a lateral boring and fastened in a pintle-hinge 6w' anchored inside a large channel-brace 5x bolted across the under side of said superstructure, directly over the hydraulic cylinder 6v. And for an ample supply of oil for the operation of the piston in said hydraulic cylinder, we have installed on the truck-beam near the fore-part thereof, an oil-supply tank 6x, on the opposite side of the chassis from the oil-pump 6y which we have installed in the chassis-frame just back of the pull-off reel 2w, to operate said oil-power cylinder. And the oil-supply pipe 6y' leading from the front end of said oil-supply tank, over into the oil-pump 6y and out again extending back along under the adjacent truck-beam and into the bottom of said oil-power cylinder; while the exhaust oil-pipe 6x' leading from the upper opposite side of said oil-power cylinder, extending along under its adjacent truck-beam, and emptying into the rear end of said oil-supply tank, fully completed the required circulatory system for the supply and exhaust of oil for operating said hydraulic cylinder for rocking the ends of said superstructure up or down at the option of the truck-driver; since the check-valve 6d' in the exhaust pipe 6x' near the oil-supply tank 6x is adapted to admit sufficient air to balance the pressure in said circulatory system, and the exhaust pipe 6x' prevents excessive movement of the hydraulic piston above the pipe's entrance to the power cylinder 6v, and allows the recession of the piston thereof.

Now, to, enable the driver to operate this hydraulic cylinder successfully and conveniently from his position in the cab, we have installed two levers reaching through the cab floor, near the driver's seat and provided with loop-handles. Of these two levers with loop-handles, the lever 1d is adapted to make connections with the driving-shaft of the truck, so that when the driver wants to raise the rear end of the superstructure, he lifts the lever 1d, shifting in the gear to drive the oil-pump 6y to raise the piston in the hydraulic cylinder 6v; and the adjacent lever 1d' is connected with the oil-supply valve which is adapted to control the oil-supply to the oil-pump 6y. And when the container-rails are high enough, the driver operates the adjacent lever 1d' closing the oil-supply valve to said said oil-pump, which arrests the upward movement of the superstructure and holds said rails in place for service at their desired hight.

The driver then backs his truck until the ends of the container-rails are over on the loading platform, so that he may pull off his changeable freight-container and pull on another, as previously described. He then moves his truck forward clear from the platform and lowers said superstructure to its normal riding position by replacing both the levers 1d and 1d' back to their normal positions. And the weight of said superstructure forces the piston of said oil-power cylinder down to its position of rest on the bottom of said cylinder, while the oil under it flows back through the supply-pipe to the supply-tank 6x, as the truck goes away on its destined route. In rocking, said superstructure is guided by the braces z and z'.

*The changeable container*

In combination with our improvements in our freight-truck, we have designed and built a new freight-container 7 adapted in form and equipment and detail of parts, to be rolled onto said truck and locked thereon in its normal riding position, so that it may safely be hauled to some other place where it may be unlocked and rolled off the truck onto some platform to be left for loading or unloading, while said truck may be driven away on another trip.

Figure 8:
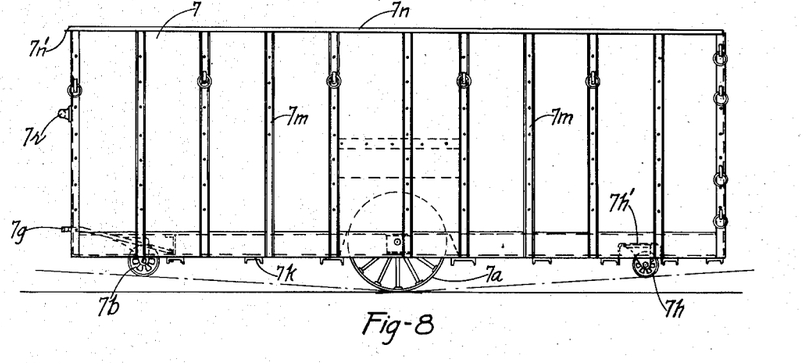
Fig. 8 is a side elevational view of our new freight-container, showing the relative sizes and position of its central wheels and casters.
Figure 13:
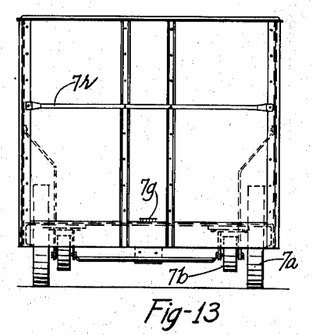
Fig. 13 is a front elevational view of said container, showing the horizontal handle-bar fastened across the front thereof and also the front elevational view of the edge the flat safety-bar beneath, adapted for the engagement of said rear locking-hooks to help hold the container in its normal riding position on said superstructure.
Figure 14:
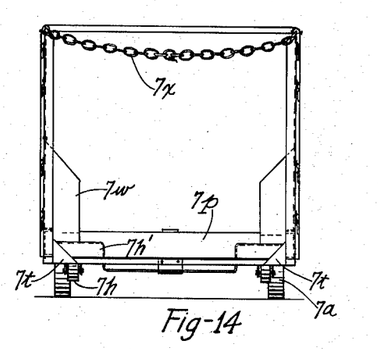
Fig. 14 is a rear elevational view of the inside of said container, showing the outline of the housings of the central-wheels and the casters thereof.

For our container 7 to be used in combination with our newly-developed power-truck, we have designed an oblong, rectangular box-like body enclosed on both sides and front, as shown in Figs. 8 and 13. The rear end is open, but provided with one or more binding chains for additional strength and the security of the load therein, Fig. 14.

Figure 12:
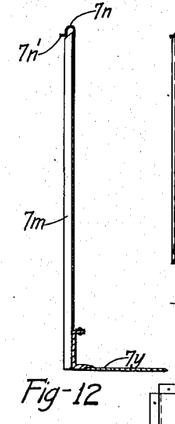
Fig. 12 is a detail view of the side and a fragment of the flooring of said container, shown partly in section and partly in elevation.

The border frame of the bottom of said container, we have constructed of strong angles welded at the corners. And the heavy sheet-iron flooring, 7y a fragment of which is shown in Fig. 12, we have bent and welded on over the horizontal flanges of said angles, along both sides, as far as the rear edge of the front-caster box 7p, which we have devised for the installation of the front-casters, 7b, 7b, which are adapted to swing easily on ball-bearings in their sockets.

Figure 18:
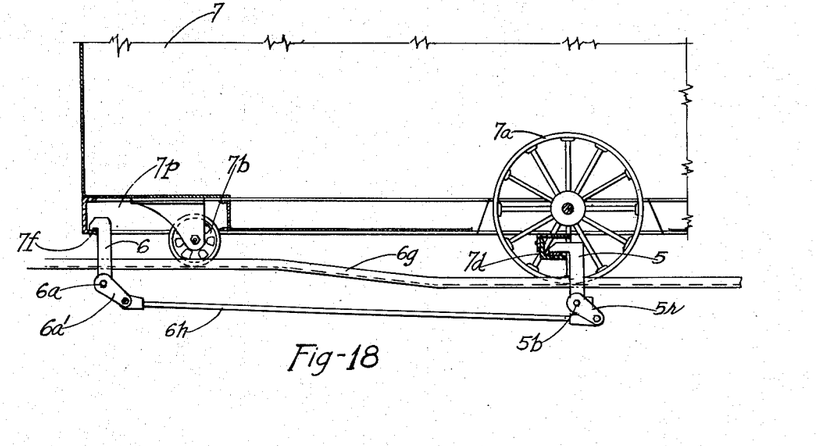
Fig. 18 is a side view of the front and the back locking-hooks in their service position, hooked onto their respective engagement parts, shown in section, on the container.

This caster-compartment 7p, we have, also, designed for the convenient and secure installation of the strong draw-bar 7g, by which the container 7 may be pulled on or off said truck. And to secure strength and durability in the installation of this draw-bar 7g, the rear end has been riveted and welded to the adjacent, transverse channel-brace of the flooring; and the front portion of said draw-bar is riveted and welded to the adjacent, transverse angle supporting the upper front edge of said caster-compartment. And down through the exposed front end of said draw-bar, two holes have been drilled and chamfered to provide for the attachment of the draft-hooks on the outer ends of said pull-on and pull-off cables of the power-winch 2 on said truck. This front-caster compartment we have further designed to give the front locking-hooks, 6, 6, access to the horizontal flange 7f of the front, bottom channel of said container-frame, and also, to allow ample room for the free movement of said front locking-hooks, as they are rocking up over said horizontal flange to lock said container in its riding place on the rails, 6g, 6g, as shown in Fig. 18.

Figure 9:
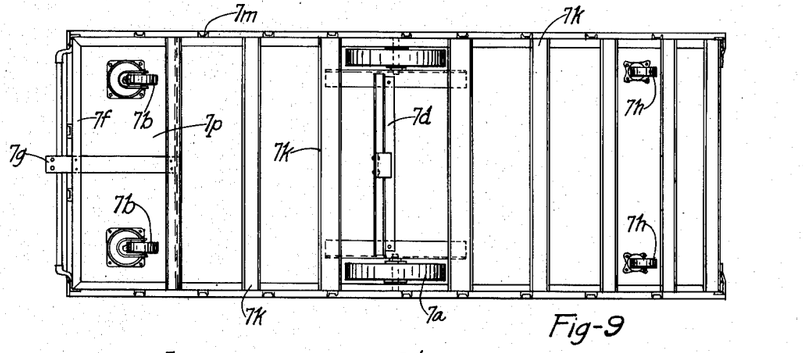
Fig. 9 is a plan view of the bottom of said container, showing the draw-bar and the horizontal flange-engagement for the two front locking-hooks, of the superstructure, and a plan view of the safety-bar fastened across the central part of the container, designed to engage the other two locking-hooks operative near the rear of said chassis.
Figure 10:
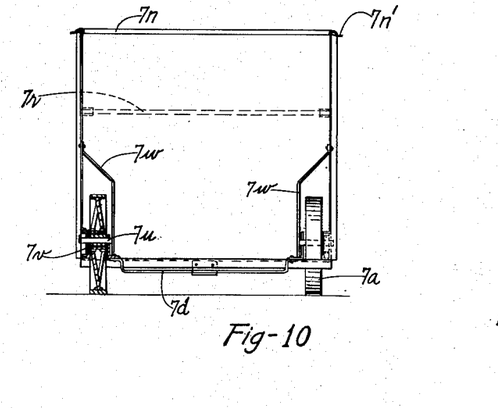
Fig. 10 is a vertical cross-section of the freight-container through the centers of the central-wheels, showing an elevational view of the safety-bar and its fastenings, adapted to engage the two rear locking-hooks installed in the chassis of the truck.

Furthermore, the sheet-iron flooring of said container has been rigidly braced by means of strong, transverse, parallel channels, 7k, 7k, shown in Fig. 9. And the sheet-iron sides and front, of said container, we have strengthened with a plurality of vertically-arranged, parallel channels, 7m, 7m, riveted to the outside thereof, shown in Figs. 8 and 9; while the top-rail 7n, a U-bar reinforced with outside angle-flange 7n', we have welded to the upper edges of said sides and front, for the sake of strength and rigidity, as shown in Figs. 10 and 12. And all corners of said container have been strengthened by means of outside angles securely riveted thereto, shown in Figs. 8, 9 and 13; while the two lower, rear corners have been further strengthened by the addition of the strong, triangular gussets, 7t, 7t, welded therein, shown in Fig. 14. And across the front of said container, we have fastened a horizontal handle-bar 7r for conveniently handling said receptacle rolling on a platform or warehouse-floor.

Figures 15, 16, 17:
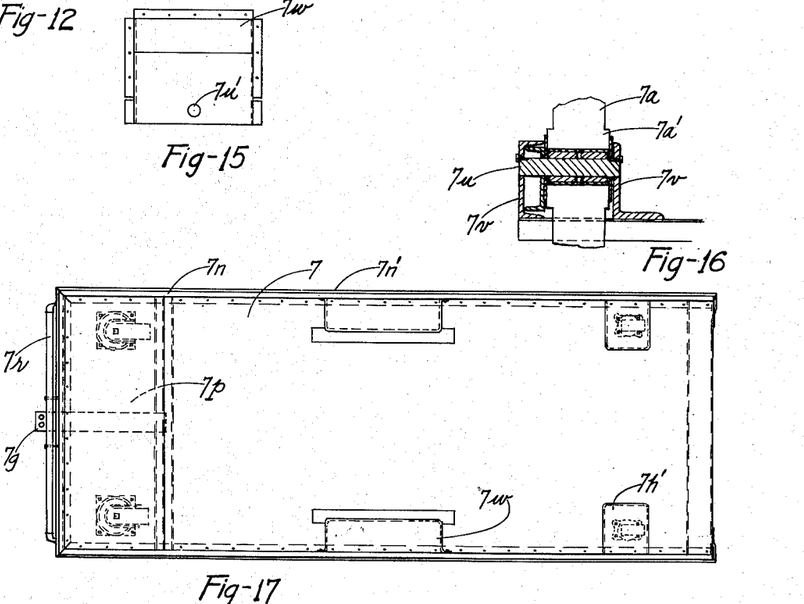
Fig. 15 is a side elevational view of one of the side-guards of the central-wheels.
Fig. 16 is a vertical sectional view in detail through the centers of the axle, hub and bearings of one of the central-wheels of said container, showing the roller bearings therein.
Fig. 17 is a plan view of the surface of the flooring and the housing of the central-wheels and the casters on which the container is easily moved.

The central wheels, 7a, 7a, of said freight-container have been designed to be large and strong enough to carry easily the full weight of said container and its load. And each one of said wheels having a hub 7a' provided with inside roller-bearings, has been installed on a short axle 7u strongly supported at each end bearing in heavy channels, 7v, 7v, shown in Fig. 16; the unit assembly being inclosed in a separate compartment on the inside of said container, on each side thereof, so that each wheel may rotate independently of the other. And all parts thereof are fully protected from the freight-load therein, by means of strong sheet-iron housings, 7w, 7w, securely fastened to the sides and the flooring of said container. And for the removal or the replacement of the short axle 7u, we have provided in the inner face of each of the housings, 7w, 7w, a hole 7u' large enough for the passage of said short axle, Fig. 15.

These large, central wheels, 7a, 7a, extend down below the floor-line of said container farther than said casters thereof, so that an operator moving said container by hand over a level floor, may, at his option, allow only the large, central wheels to touch. But when said container is in its normal riding position on said truck, it is desirable that its loaded flooring be level; and to bring about this condition, we have wrought an upward curvature in the front portion of the container-rails, 6g, 6g, of said truck, sufficiently high to meet the front casters and raise them high enough to cause a level floor in said container on the truck; while the front locking-hooks, 6, 6, when hooked over the horizontal flange 7f of the front, bottom frame-channels of said container, securely hold the front end of said container from any upward movement, Fig. 18. Thus the freight-container 7 in its ride on said truck, is securely confined not only to its normal riding position, but held always level with the superstructure of said truck.

The rear casters, 7h, 7h, are installed in separate compartments, 7h', 7h', made of heavy sheet-iron, securely anchored in the flooring of said container, near the rear and close to the sides thereof; said compartments standing a little above said flooring. And we have made these rear casters, 7h, 7h, smaller than the front casters, so that the rear end of said freight-container may be set comparatively low for convenience in loading or unloading said container with parcels of freight.

But, of course, it should be fully understood that the specific detail of the various parts of the instant embodiment of our invention, as we have herein illustrated in the drawings thereof and fully described, are not to be considered as limitations in the construction of our combination freight-truck with changeable container; and that, while keeping within the scope of our invention and claims, we may make desirable modifications in these details to facilitate production or to economise in the fabrication of the parts thereof, provided we keep within the spirit of our invention.

Now, having thus described the various features of our invention, the detail construction, arrangement and combination of its parts, as well as its functions and the ways and means of operation and application; those features and accessories of our combination freight-truck with changeable container, that we consider new and representative of utility and efficiency, on which we desire Letters Patent granted to us, we have herein below set forth and specifically described in the following claims.

We claim as our invention:

1. In a motor-truck of the kind described, having a cab and chassis-frame,—a transverse rocker-shaft installed on said frame; a broad superstructure mounted on said rocker-shaft and adapted for the transportation of changeable, wheeled freight-containers; means on said frame and superstructure for quickly pulling said containers thereon or thereoff; adequate means on said superstructure for protecting the freight-containers from the weather in the transportation thereof; strong integral walkways along either side of the superstructure to help strengthen said weather-protecting means and to afford the driver or assistant a safe footing in the adjustment or the repair thereof; an oil-power jack of the hydraulic type mounted on said chassis-frame to rock said superstructure; means for operating said jack from the motor cab to adjust within certain limits the height of the rear end of said superstructure to the heights of various loading platforms; a pair of broad, parallel container-rails securely mounted along the length of said superstructure and extending somewhat beyond the rear end thereof in a slight downward curve to facilitate the movement of said container on or off the superstructure; and in subcombination with said container-rails, means for arresting the loading movement of said freight-container on said rails to determine its final resting place, so that it may be locked in a definite position for transportation on said superstructure.

2. In a motor-truck of the kind described, having a cab with a driver's seat therein, a chassis-frame and a superstructure thereon adapted for the transportation of changeable, wheeled containers,—a power-winch equipped with a rotatable reel-shaft carrying a friction-clutch near each end thereof operable at desirable times through the truck-power; a pull-on cable-reel and a pull-off cable-reel, both being idle normally on said shaft between said clutches and adapted to be driven thereby at the option of the driver; cable-means on said reels for shifting said changeable containers; two pairs of locking hooks on said superstructure adapted to engage two members on the underside of the loaded container when set in its riding position on the superstructure; mechanism operable from the truck-power and adapted for forcing both pairs of said hooks into their service positions to lock said container securely from moving out of its riding place in transportation, said mechanism being adapted also for forcing said hooks to unlock the container for removal; a lever in said cab at the left of the driver's seat, and in subcombination therewith a split-propeller-powertake-off gearing and other means installed in said chassis-frame and adapted for coacting with the backward movement of said lever to throw the truck-power out of road-gear into winch-gear, automatically unlocking said container for removal and coacting with the forward movement of said lever, to throw the truck-power out of winch-gear into road-gear, thereby automatically locking said container on the superstructure for transportation.

3. The combination of claim 2, further characterized by reversible, means controllable from the cab for rotating said cable-reels individually or in unison in either direction, so that the driver from his seat in the cab, may use either reel to ease the too free movement of the container while being operated with the other reel, and may also free either cable from slack-loops that may incidently form therein.

4. A motor-truck as defined in claim 2, wherein positive-stop means cooperate in subcombination with the front wall of said container to determine the final resting place thereof on said superstructure, that the container may be securely locked against shifting or bouncing during transportation.

5. A motor-truck according to claim 1, including conveyor-means separately controlled from the cab and operable from the truck-power for moving the freight-containers onto and off the superstructure.

6. A motor-truck according to claim 1, including conveyor-means for moving freight-containers onto and off the superstructure and manually-operative coupling means for coupling the containers with the conveyor-means.

WM. C. GIBSON.
LINDSAY R. HURST.